March 25, 1969     G. NATTA ET AL     3,435,017
ISOTACTIC POLYMERS OF BUTENE-1
Original Filed June 8, 1955
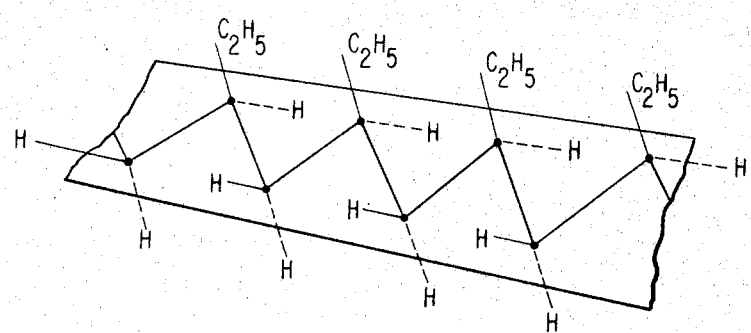
GIULIO NATTA
PIERO PINO
GIORGIO MAZZANTI
       INVENTORS
BY
       ATTORNEYS

United States Patent Office 3,435,017
Patented Mar. 25, 1969

3,435,017
ISOTACTIC POLYMERS OF BUTENE-1
Giulio Natta, Piero Pino, and Giorgio Mazzanti, Milan, Italy, assignors to Montecatini Edison S.p.A., Milan, Italy
Original application June 8, 1955, Ser. No. 514,099. Divided and this application June 13, 1958, Ser. No. 741,715
Claims priority, application Italy, July 27, 1954, (Rome) 10,037/54, (Milan) 25,109/59
Int. Cl. C08f 3/12, 1/56
U.S. Cl. 260—93.7  5 Claims

ABSTRACT OF THE DISCLOSURE

Polybutene-1 consisting essentially of isotactic polybutene-1 is described. The polymer may be prepared by successive solvent fractionation of crude polybutene-1 containing the isotactic macronmolecules with boiling acetone and boiling ethyl ether.

---

This invention relates to new, linear, regular head-to-tail polymers of butene-1 (alpha-butene).

This application is a division of our application Ser. No. 514,099, filed June 8, 1955.

More particularly, the invention relates to high molecular weight crystalline polymers of butene-1.

In the copending application Ser. No. 514,097 filed concurrently herewith by the same inventors (now abandoned) there is described and claimed a method for producing polymers and copolymers of the higher alpha-olefines using, as polymerization aid, a catalyst obtained by mixing a catalytic heavy metal compound such as titanium tetrachloride, and a catalytic metal alkyl compound such as aluminum triethyl, in a solvent inert to the polymers to be formed, such as a saturated aliphatic hydrocarbon, in a ratio such that the number of moles of the metal alkyl component is not more than ten times the number of moles of the heavy metal compound and is preferably less than five times the latter, as for instance, in a molar ratio of 10:1 to 3:1.

As described in said application Ser. No. 514,097, polymerization of the higher alpha-olefines can be accomplished by mixing an inert solvent solution of the catalytic heavy metal compound with an inert solvent solution of the catalytic metal alkyl component, adding at least one of the higher alpha-olefines, or a mixture thereof with another monomer such as ethylene, to the catalyst, and heating the mass to effect the polymerization.

In a specific embodiment of that method there may be used advantageously, as the metal alkyl component, a compound in which the alkyl radicals contain the same number of carbon atoms as the higher alpha-olefine to be polymerized.

In another modification of the described polymerization method, the higher alpha-olefines or mixtures containing them are polymerized by preparing the catalyst from the catalytic heavy metal compound and the catalytic metal alkyl component in the presence of an olefine, most desirably the alpha-olefine to be polymerized. Or the metal alkyl component and the alpha-olefine, or polymerizable mixture are first brought together, and the heavy metal compound is then added thereto.

The present application is concerned with the butene-1 polymers obtainable by the above-mentioned methods, which products are claimed herein.

These products are, initially, mixtures of linear head-to-tail polymers having no branches longer than R, which mixtures comprise, mainly, amorphous and crystalline polymers which can be separated by fractional dissolution.

These polymers, depending on their steric structure and molecular weight, exhibit very different characteristics. The amorphous polymers have viscous elastic properties which lie between those of a highly viscous liquid and those of an unvulcanized, noncrystallizable elastomer, while the solid, highly crystalline polymers, which can be oriented by drawing, are fiber forming.

Both the amorphous and crystalline polymers are linear as shown by their infrared spectra.

The differences in the properties of our two types of polymers must be attributed to a different distribution, along the main chain, of those asymmetric carbon atoms having the same steric configuration.

According to Flory (Principles of Polymer Chemistry, 1953, pp. 55–56, 237–238) a vinyl polymer containing asymmetric carbon atoms as, for example

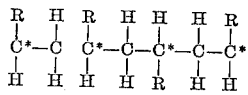

may be considered as a copolymer of two different monomer units

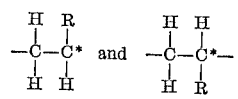

in one of which the asymmetric carbon atom (C*) has an *l*-configuration, and in the other a *d*-configuration.

When such monomer units containing an asymmetric carbon atom showing a *l*- or *d*-configuration recure statistically along the polymer chain, as is generally the case in all of the previously known vinyl polymers, the polymers may be considered as a copolymer of the two types of structural units and, therefore, if the substituent R is much larger than a hydrogen atom, the polymer is substantially noncrystalline and does not show any first order transition point.

In contrast to the structure of the known polymers as illustrated above, our polymers are not copolymers in the sense of Flory, but have a high degree of crystallinity because, apparently at least for long portions of the main chain, all of the asymmetric C atoms have the same steric configuration.

The structure of our new crystalline high molecular weight polymers of butene-1 was determined from X-ray data on drawn fibers of the polymers.

The dimensions of the elementary cell for our crystalline polybutene-1 were measured by us and are shown in Table I below.

TABLE I

Polymer (poly-alpha butene):

| | |
|---|---:|
| Identity Period along the chain axis, A. | 670±0.1 |
| X-ray melting point, ° C. | 125 |
| X-ray density | 0.96 |
| Density by weight | 0.91 |

NOTE.—The X-rays densities were calculated for polybutene on the basis of an hexagonal cell (space-group R3c having a=17.3 A.) The cell contains 6 chain portions containing each 3 monomeric units.

By comparing X-ray and density data, it may be seen that each stretch of principal chain included in the elementary cell corresponds to 3 monomeric units

and that, therefore, a regular succession of monomeric units having alternating *d* and *l* asymmetric carbon atoms can be excluded. Among all possible remaining regular successions of *d* and *l* asymmetric carbon which could lead to a crystalline polymer it is believed, on the basis of the X-ray data, that the most probable is the one in which, at least for long portions of the main chain, all the asymmetric C atoms have the same steric configuration.

The accompanying drawing is a model of a portion of a main chain of a crystalline polybutene-1 according to the present invention, arbitrarily fully extended in a plane and in which the $C_2H_5$ substituents on the tertiary carbon atoms are, in the particular model shown, all above the plane of the chain, and their H atoms are all below the plane of the chain.

In this case the stable existence of a planar fully extended paraffinic chain is most unlikely owing to the steric hindrance of the substituent groups R. In the crystalline state, the main chain must therefore assume a nonplanar conformation. We have found this conformation to be spiral-like.

The hypothesis of a coiled conformation of the main chain in the crystalline state agrees with the value of the identity period along the same chain (6.70±0.1) which is smaller than the length of the planar, fully extended structure (7.62 A. for 3 monomeric units).

Our linear, regular head-to-tail macromolecules having substantially no branches longer than $C_2H_5$ and the main chain of which has substantially the kind of structure illustrated in the model (isotactic structure) are recognized in the art (following us) as "isotactic" macromolecules, whereas our macromolecules having substantially no branches longer than $C_2H_5$ and in which the asymmetric C atoms of the two possible steric configurations have a substantially random distribution along the main chain, are recognized in the art (following us) as "linear, regular head-to-tail atactic" macromolecules.

The term "isotactic" was originated by one of us, G. Natta, for identifying the structure of the kind shown in the model, the macromolecules having substantially that kind of structure and the polymers consisting of these macromolecules substantially having that kind of structure. (See, for example, the Natta et al. communication to the Editor of the Jr. American Chemical Society, published in said Journal on Mar. 20, 1955, received for publication Dec. 10, 1954; and the Natta article published in the Journal of Polymer Science; April 1955, vol. XIV, Issue No. 82, pp. 143–154, received for publication on Feb. 17, 1955.)

The isotactic structure imparts to the new products properties not previously known for any polymer of an unsaturated hydrocarbon of our type.

In fact those of our polymers having a high molecular weight are, at room temperature, crystalline solids very different, e.g., from the elastomers obtained by known methods from isobutylene, which are crystallizable under stress and show a spiral-like linear chain, but with a different identity period. The known polyisobutylene, in nonstretched condition, is crystalline only below room temperature, whereas the crystalline polybutene-1, of this invention, only loses its crystallinity at temperatures above 120–130° C.

The substantial differences in the physical properties of the two types of polymers which we have prepared, are summarized in the following Table 2.

molecular weight. The solubilities of polymers of the same type (i.e. amorphous or crystalline) but of different molecular weights decrease slightly and gradually with increase in the molecular weight.

The high molecular weight polymers of butene-1 of the invention, in suitably purified condition, may be molded at suitable temperature to obtain plates or sheets which are transparent. The plates or sheets may be cold-stretched up to about 700%. The braking load, referred to the section resulting after stretching, may be very high.

It is not necessary to separate the amorphous polymers from the crystalline polymers before producing shaped articles such as filaments, sheets, foils, etc. In fact, it may be preferred, at least in some instances, to mold the polymerizate comprising the amorphous and crystalline polymers to the desired shape, and then remove the amorphous polymers from the shaped object by treating it with a solvent for the amorphous polymers which does not dissolve or appreciably swell the crystalline polymers. For example, in producing filaments, the amorphous polymers of lower molecular weight serve as plasticizers for the crystalline polymers and, by lowering the viscosity of the mass, permit extrusion thereof at lower temperatures and pressures. The plasticizing amorphous polymers also facilitate orientation of the molecules during drawing of the extruded filaments.

Thus, the polymerizate comprising the amorphous and crystalline polymers may be converted by heat to a soft, plastic or even molten mass, extruded through a spinneret to form filaments which are treated with a solvent for the amorphous polymers which are thus dissolved out, leaving filaments consisting of the higher molecular weight, crystalline polymers.

The viscosity of our polybutenes increases with increase in the molecular weight. The polymers of very low molecular weight (up to a few thousands) occur as viscous liquids, with a very high viscosity index. The polymers of higher molecular weight even higher than 30,000–40,000 still exhibit viscous properties and, therefore, are not true elastomers.

The following examples are given to illustrate preferred embodiments of the invention, it being understood that these examples are not intended as limitative. The average molecular weights of the products were estimated from specific viscosity measurements in tetrahydronaphthalene solutions at a polymer concentration of 0.1 gm. per 100 gms. of solvent, and from intrinsic viscosity measurements. Specific viscosity is the viscosity of the solution less the viscosity of the solvent, divided by the viscosity of the solvent. By "intrinsic viscosity" is meant the limit of the ratio between the specific viscosity and concentration, for concentrations tending to zero:

$$C \xrightarrow{\text{Limit}} 0 \frac{\eta \text{ spec.}}{C}$$

where C is the concentration of the solution in gms./cc.

In this manner it was estimated that the average molecular weight of the solid amorphous and crystalline polymers of the invention is usually above 20,000. Polymers

TABLE 2

| Polymer | 1st order transition, temp., °C.[1] | 2nd order transition, temp., °C. | Measured density | Solubility in— | | | | |
|---|---|---|---|---|---|---|---|---|
| | | | | Acetone | Ethyl acetate | Ethyl ether | Boiling n-heptane | Toluene |
| Crystalline polyalphabutene | 120–130 | | 0.91 | i | i | i | S. | V.S. |
| Amorphous polyalphabutene | | | 0.87 | S.S. | S.S. | S. | V.S. | V.S. |

[1] Rontgenographic melting point.
i=Insoluble, S.=Soluble, V.S.=Very soluble, S.S.=Slightly soluble.

The very remarkable differences in the solubilities of the two types of polymers, amorphous and crystalline, permit of their ready separation by extraction with suitable solvents.

For a given polymeric mixture according to the invention, the crystalline polymers are always less soluble than the amorphous polymers, independently of the having an average molecular weight above 2,000 and up to 100,000 or higher may be obtained.

EXAMPLE I 160 ml. of gasoline containing 5.7 gms. of triethyl aluminum, and 85 gms. of butene-1 (Phillips Petroleum Co. technical grade) are introduced into a 435 ml. autoclave.

The autoclave is heated to 81° C., and 1.8 gms. of titanium tetrachloride dissolved in 35 ml. of gasoline are added. The temperature increases spontaneously to some degree. After about one hour, a further quantity of titanium tetrachloride dissolved in gasoline is added. A spontaneous temperature increase of about 10° C. occurs. The autoclave is agitated for some hours at 90–98° C.

By purifying the butene-1 polymerizate as described in United States Patent 3,112,300, 10 gms. of a white solid polymeric product are obtained. This product softens at 110° C. and appears crystalline under the X-rays. The residue of the extraction with ether corresponds to 46% of the total polymer and has an intrinsic viscosity of 1.44 ml./gm. determined in tetrahydronaphthalene.

EXAMPLE II 400 ml. of gasoline containing 11.4 gms. of triethyl aluminum, and 291 gms. of a butene-2-/butene-1 mixture (with 70% of butene-1) are introduced into a 2150 ml. autoclave. The autoclave is then heated to 71° C. and 3.6 gms. of titanium tetrachloride dissolved in gasoline are added; the temperature rises to 77° C. After two hours a further addition of 3.6 gms. of titanium tetrachloride is made. The autoclave is kept in agitation for some hours at temperatures in the range 80–85° C. Operating as in the foregoing example, 86 gms. of white solid product are obtained. This product has characteristics similar to those described in Example I and softens at 125° C. Fibers are readily obtained from this product by extrusion through a spinneret under nitrogen pressure at temperatures above the softening point.

The polymers of butene-1 are, initially, mixtures of amorphous and crystalline polymers which can be separated by solvents.

Filaments of the crystalline polymers of butene-1 can be obtained.

In general, when butene-1 is polymerized in the presence of small amounts of other olefines or of a diolefine containing a vinyl group, the high polymers obtained have a certain crystallinity similar to that of butene-1 homopolymer.

It will be evident from the foregoing that this invention provides wholly new polymers of butene-1 which have, depending on their exact composition and molecular weights, widely varying properties which adapt them to a variety of uses in the plastic materials and elastomer arts.

Since some changes and modifications in the specific details given in the examples may be made in carrying out the invention, it is to be understood that it is not intended to limit the invention except as defined in the appended claims.

What is claimed is:

1. As a new product, polybutene-1 consisting essentially of isotactic polybutene-1 made up of isotactic macromolecules non-extractable with boiling ethyl ether and having, for substantially the entire length of the macromolecular main chain, the type of stereoregular structure illustrated in the model of a portion of an isotactic polybutene-1 macromolecule, fully extended in a plane, as shown in the accompanying drawing.

2. Shaped articles of a polybutene-1 according to claim 1.

3. Sheets of a polybutene-1 according to claim 1.

4. Fibers of a polybutene-1 according to claim 1.

5. A normally solid polymer of butene-1 consisting essentially of recurring butene-1 units which is linear and substantially crystalline.

References Cited

UNITED STATES PATENTS

| | | | |
|---|---|---|---|
| 2,825,721 | 3/1958 | Hogan et al. | 260—94.9 |
| 2,858,902 | 11/1958 | Cottle | 260—93.7 |

U.S. Cl. X.R.

260—85.3, 88.2, 93.5

UNITED STATES PATENT OFFICE
CERTIFICATE OF CORRECTION

Patent No. 3,435,017   March 25, 1969

Giulio Natta et al.

It is certified that error appears in the above identified patent and that said Letters Patent are hereby corrected as shown below:

In the heading to the printed specification, line 10, "(Rome) 10,037/5 (Milan) 25,109/59" should read -- (Rome) 10,037/54, (Milan) 25,109/54 --. Column 2, line 53, "Identity Period along the chain axis, A.- - - 670 $\pm$ 0.1 should read -- Identity Period along the chain axis, A. - - - 6.70 $\pm$ 0.1 --

Signed and sealed this 31st day of March 1970.

(SEAL)
Attest:

Edward M. Fletcher, Jr.
Attesting Officer

WILLIAM E. SCHUYLER, J
Commissioner of Patent